March 21, 1961  B. HEYMAN  2,976,019
FITTING CLIP
Filed Nov. 20, 1958

INVENTOR
Benjamin Heyman

BY *Walter G. Finch*
ATTORNEY

United States Patent Office 2,976,019
Patented Mar. 21, 1961

2,976,019

FITTING CLIP

Benjamin Heyman, Baltimore, Md., assignor to Anchor Post Products, Inc., Baltimore, Md., a corporation of New Jersey Filed Nov. 20, 1958, Ser. No. 775,242

11 Claims. (Cl. 256—47)

This invention relates generally to chain hooks, and more particularly it pertains to a clip for securing wire mesh or chain link fabric to a fence post.

In the past, hook type clips have been employed in securing wire mesh to metallic posts. These hooks have the disadvantage of pivoting loosely and also having the line of tension pass through the mounting hole or bracket therefor.

It is an object of this invention to provide a hook-like fitting clip which is easily installed in but a single hole without bracketing, screws or other auxiliary hardware, and which has the property of furnishing an offset self-clamping securement for fence chain link fabric or wire mesh to rectangular shaped tubing posts.

Still another object of this invention is to provide a novel fitting clip or clips for attaching a chain link stretcher rod to a fence post.

And still another object of this invention is to provide a new type of clip which will maintain a stretcher rod for wire mesh or chain link fabric at a predetermined distance from the center line of a fence post.

Even another object of this invention is to provide a new type clip which is so designed that it cannot be removed under stretching tension when the chain link fabric is stretched to position at a fence post.

These and other objects and advantages of this invention will become more readily apparent and understood from the acompanying specification and drawings in which.

Figure 3:
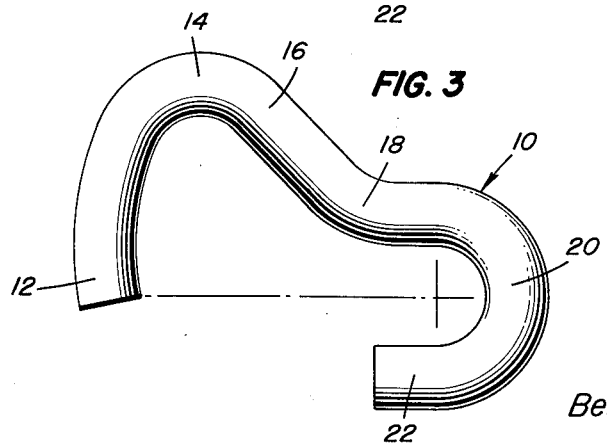
Fig. 3 is an enlarged elevation of a clip, incorporating features of this invention.

Referring now to Fig. 3 of the drawing, there is shown a clip 10 which may be made of metal rod or flat strap. Clip 10 has a large radius bight 12 at one end which merges into a short radius curve portion 14. This clip 10 then has a straight intermediate portion 16 and a short radius reverse curve portion 18 which join to a 180 degree short radius bight 20 having a short straight termination portion 22.

Figure 1:
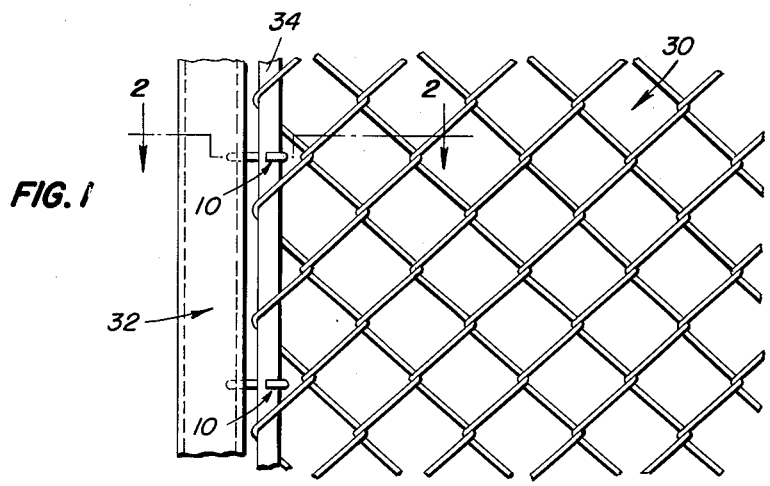
Fig. 1 is a side elevation of an end portion of a fence, incorporating the novel fitting clip of the present invention.
Figure 2:
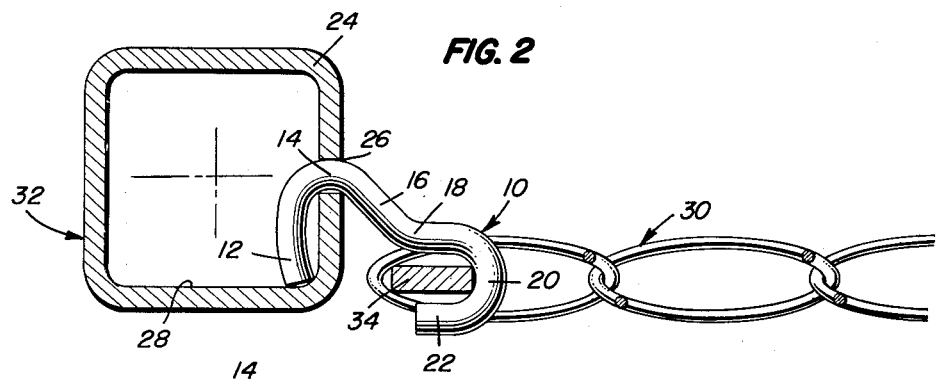
Fig. 2 is an enlarged cross section taken in the direction of the arrows 2—2 of Fig. 1.

As shown in Figs. 1 and 2, a plurality of these clips 10 are installed on fence posts 32 of rectangular tubing 24. The large bight 12 is passed through a small aperture 26 made in the tubing 24 and the short radius bight 20 of each clip 10 embraces a stretcher rod 34 interwoven through the sides of wire mesh or chain link fabric 30.

As illustrated in Fig. 2, the tensioned mesh or fabric 30 by means of stretcher rod 34 pivots the end of each large bight 12 against the inside of fence post 32. As clip 10 pivots about the inside of aperture 26, curve portion 14 bears against the side of aperture 26 and holds the plane of the wire mesh or chain link fabric 30 offset therefrom and desirably in flush relationship to the inner surface 28 of post 32.

It is obvious that by means of the improved clip 10, a better appearing and more secure fence results with a more easily accomplished assembly operation and a minimum of expensive parts and fittings.

It will also be noted that the chain link fabric 30 is stretched to position at the post 32 so that the clip 10 may not be removed subsequently thereafter. Additionally, the clip 10 maintains the stretcher rod 34 at a predetermined distance from the center lines of the post 32, as previously mentioned.

In summary, therefore, the contours of the clip 10 are so arranged as indicated that it may be inserted in the aperture 26 in the post 32 without interference. Once the clip 10 is placed in position, tension on the wire mesh or chain link fabric 30 tightens the clip 10 in position and from this position it cannot be withdrawn by further tension on the chain link fabric (wire mesh) 30. The clip 10 in the position indicated establishes a contact between the aperture 26 and the inner surface of the post so that the offset dimension is fixed at a known quantity, such as $25/32$ inch from the plane passing transversely through the longitudinal axis of the post 32 and the face of the post containing the apertures 26, or any other suitable dimension can be obtained.

Obviously, many other modifications and variations of the present invention are possible in the light of the above teachings. It is, therefore, to be understood that within the scope of the appended claims the invention may be praticed otherwise than as specifically described.

What is claimed is:

1. A coupling arrangement for connecting a strip of material to a polygonal shaped hollow post having a plurality of spaced apertures provided in one face thereof along a line located substantially parallel to the longitudinal axis of said post and a plane passing through the longitudinl axis of said post and located transversely to the face of said post containing said apertures, said coupling arrangement including a plurality of open end clips, each said clip having a different radius coplanar bight at opposite ends thereof and arranged at substantially right angle to each other, with each bight having a terminal end, together with an intermediate portion connecting said bights together such that a plane passing through the center of radius of one of said bights and the terminal end of the other of said bights will be spaced from said intermediate portion of said clip, one of said bights being mechanically connected to said strip of material and the other of said bights passing through its respective aperture in said post to connect to the interior of said post to secure and offset said material laterally from said plane passing through the longitudinal axis of said post and said line in said face thereof containing said apertures, with said strip of material being located substantially normal to the face of said polygonal shaped hollow post when in a stretched condition.

2. A coupling arrangement for connecting a strip of material to a polygonal shaped hollow post having a plurality of spaced apertures provided in one face thereof along a line located substantially parallel to the longitudinal axis of said post and in a plane passing through the longitudinal axis of said post and located transversely to the face of said post containing said apertures, said coupling arrangement including a stretcher bar mechanically associated with the edge of said material, and other means including a plurality of open end clips, each said clip being coplanar and having a different radius bight at its opposite ends, with each said bight being arranged at substantially a right angle to the other bight thereof and each bight having a terminal end, and an intermediate portion connecting said bights together such that a plane passing through the center of radius of one of said bights and the terminal end of the other of said bights will be spaced from said intermediate portion of said clip, one of said bights being mechanically connected to said stretcher bar and the other bight thereof passing through its respective aperture in said post to connect to the interior of said post to secure and offset said material laterally from said plane passing through the longitudinal axis of said post and said line in said face thereof containing said apertures, with said strip of material being located substantially normal to said face of said polygonal shaped hollow post when in a stretched condition.

3. A coupling arrangement for connecting a strip of chain link fabric to a structural member having a surface with a plurality of spaced apertures provided in said surface thereof along a line located substantially parallel to the longitudinal axis of said structural member and in a plane passing through the longitudinal axis of said structural member and through said line in said surface of said structural member containing said apertures, said coupling arrangement having means including a stretcher bar passing through the mesh at one end of said chain link fabric, and offset means including a plurality of open end clips, each said clip having coplanar and different radius bights at its opposite ends, with each said bight being arranged at substantially a right angle to the other bight thereof and each bight having a terminal end, and an intermediate portion connecting said bights together such that a plane passing through the center of radius of one of said bights and the terminal end of the other of said bights will be spaced from said intermediate portion of said clip, one of said bights beng mechanically connected to said stretcher bar and the other bight passing through its respective aperture in said structural member to connect to the surface of said structural member to secure and offset said chain link fabric laterally from said plane passing through the longitudinal axis of said structural member and said line in said surface thereof containing said apertures, with said strip of chain link fabric being located substantially normal to said surface of said structural member when in a stretched condition.

4. An arrangement for coupling a strip of material to a structural member of substantially elongated shape having at least one row of spaced apertures provided on one face thereof along a line located substantially parallel to the longitudinal axis of said structural member and in a plane passing through the longitudinal axis of said structural member and located transversely to the face of said structural member containing said row of apertures, said arrangement including a plurality of offset, open end clips, each said clip having a different radius coplanar bight at opposite ends thereof and arranged at substantially a right angle to each other, with each bight having a terminal end, together with an intermediate portion connecting said bights together such that a plane passing through the center of radius of one of said bights and the terminal end of the other said bights will be spaced from said intermediate portion of said clip, one of said bights being mechanically connected to said strip of material and the other of said bights passing through its respective aperture in said structural member to connect to said structural member to secure and offset said material laterally from said plane passing through the longitudinal axis of said structural member and said line in said surface thereof containing said apertures, with said strip of material being located substantially normal to said face of said structural member when in a stretched condition.

5. An arrangement for coupling a piece of material located within one plane to a structural member of elongated shape having at least one aperture provided in one face thereof, said coupling arrangement including a stretcher bar mechanically associated with the edge of said piece of material, and at least one offset, open end clip, said clip having different radius coplanar bights at opposite ends thereof and arranged at substantially a right angle to each other, with each bight having a terminal end, together with an intermediate portion connecting said bights together such that a plane passing through the center of radius of one of said bights and the terminal end of the other of said bights will be spaced from said intermediate portion of said clip, one of said bights being mechanically connected to said stretcher bar and the other bight thereof passing through the aperture in said structural member to connect to the interior of said structural member to secure and offset said piece of material laterally from the plane passing through the longitudinal axis of said structural member and the surface of said structural member containing said aperture, with said piece of material being located substantially normal to said face of said structural member when in a stretched condition.

6. An arrangement as recited in claim 5, wherein said clip has a large radius bight at one end thereof, a short radius bight at the opposite end thereof, an intermediate short radius curve portion which merges into said large radius bight, an intermediate straight portion which merges into said intermediate short radius curve portion, and an intermediate short radius reverse curve portion which merges into said intermediate straight portion and said short radius bight, with the end of said large radius bight being arranged to engage the inner surface of said structural member, and said intermediate short radius curve portion being arranged to engage the surfaces of said aperture, with said small radius bight being connected to said stretcher bar.

7. An arrangement for connecting a strip of chain link fabric to an elongated shaped post having a plurality of spaced apertures provide in the surface thereof along a line located substantially parallel to the longitudinal axis of said post and in a plane passing through the longitudinal axis of said post and through said line in said surface of said post containing said apertures, said arrangement including a stretcher bar means passing through the mesh at one end of said chain link fabric, and offset means including a plurality of open end clips, each said clip having different radius bights co-planarly arranged at its opposite ends, with each said bight being arranged at substantially a right angle to the other bight thereof and each bight having a terminal end, and an intermediate portion connecting said bights together such that a plane passing through the center of radius of one of said bights and the terminal end of the other of said bights will be spaced from said intermediate portion of said clip, one of said bights being mechanically connected to said stretcher bar and the other bight thereof passing through its respective aperture in said post to connect to the interior of said post to secure and offset said chain link fabric laterally from said plane passing through the longitudinal axis of said post and said line in said surface thereof containing said apertures, with said strip of material being located substantially normal to the surface of said post when in a stretched condition.

8. A coupling arrangement for connecting a piece of lineal material to a structural member of elongated shape having at least one aperture provided in one face thereof, said arrangement consisting of an offset, open end clip, said clip having coplanar different radius bights at opposite ends thereof, with each said bight being arranged at substantially a right angle to the other bight thereof and each bight having a terminal end, and an intermediate portion connecting said bights together such that a plane passing through the center of radius of one of said bights and the terminal end of the other of said bights will be spaced from said intermediate portion of said clip, one of said bights being mechanically connected to the lineal material and the other bight thereof passing through said aperture in said structural member to connect to said structural member so as to secure and offset said piece of lineal material from the plane passing through the longitudinal axis of said structural member and the surface of said structural member containing said aperture so that said lineal material is located substantially normal to the face of said member, whereby a lineal material formed of cable, wire, rope, and the like, can be coupled by said offset clip to said structural member.

9. In combination, a structural member of elongated shape having at least one aperture provided in one face thereof, a piece of lineal material, and a coplanar offset, open end clip with a radius bight at opposite ends thereof and arranged at substantially a right angle to each other and with each bight having a terminal end, together with an intermediate portion connecting said bights together, said bights being so arranged such that a plane passing through the center of radius of one of said bights and the terminal end of the other of said bights is spaced from said intermediate portion of said clip with one of said bights being mechanically coupled to said lineal material and the other of said bights passing through said aperture in said structural member to connect to said structural member so as to secure and offset said piece of lineal material from the plane passing through the longitudinal axis of said structural member and the surface of said structural member containing said aperture, whereby a lineal material formed of cable, wire, rope, and the like, can be coupled by said offset clip to said structural member.

10. As an article of manufacture, a coplanar open-end fitting clip for securing and laterally offsetting a piece of material from a structural member, said clip including a large radius bight with a terminal edge portion located at one end thereof, a short radius bight located at the opposite end thereof, said bights being located at substantially a right angle to each other, an intermediate short radius curve portion which merges into said large radius bight, an intermediate straight portion which merges into said intermediate short radius curve portion, and an intermediate short radius reverse curve portion which merges into intermediate straight portion and said short radius bight, with said large and small radius bights and straight and curved portions being so arranged that a plane passing through the center of radius of said short radius bight and the terminal edge portion of the long radius bight will be spaced from said curved and straight line portions of said clip.

11. As an article of manufacture, a coplanar clip for maintaining a fixed relationship between two structural members, said clip including a first radius bight having a terminal edge portion located at one end thereof, a second radius bight located at the opposite end thereof, said bights being located at substantially a right angle to each other, an intermediate radius curve portion which merges into said first radius bight, an intermediate straight portion which merges into said intermediate radius curve portion, and an intermediate radius reverse curve portion which merges into said intermediate straight portion and said second radius bight, with said first and second radius bights, said intermediate radius curve and intermediate radius reverse curve portions as well as said straight portion being so arranged that a plane passing through the center of radius of said second radius bight and the terminal edge portion of said first radius bight will be spaced from said intermediate radius curve and reverse curve and straight portions of said clip.

References Cited in the file of this patent

UNITED STATES PATENTS

| | | |
|---|---|---|
| 1,234,112 | Amberg | July 24, 1917 |
| 1,516,179 | Ferris | Nov. 18, 1924 |
| 1,631,942 | Thomson | June 7, 1927 |
| 2,591,986 | Weiss et al. | Apr. 8, 1952 |